United States Patent [19]
Lermite et al.

[11] Patent Number: 5,389,242
[45] Date of Patent: Feb. 14, 1995

[54] PROCESS FOR THE FRACTIONATION OF OIL AND GAS ON A PETROLEUM DEPOSIT EFFLUENT

[75] Inventors: Christophe Lermite, Paris; Joseph Larue, Chambourcy; Alexandre Rojey, Rueil Malmaison, all of France

[73] Assignee: Institut Francais du Petrole, Rueil-Malmaison, France

[21] Appl. No.: 925,698

[22] Filed: Aug. 7, 1992

[30] Foreign Application Priority Data

Aug. 8, 1991 [FR] France .................. 91 10230

[51] Int. Cl.⁶ .................. C10G 7/00; C10G 7/02
[52] U.S. Cl. .................. 208/347; 208/340; 208/349; 208/350; 208/351; 208/353; 208/354; 208/355; 208/357; 208/358; 208/364; 208/365; 196/100
[58] Field of Search .............. 208/308, 340, 347, 349, 208/351, 353, 358, 364, 365, 350, 354, 355, 357; 196/100

[56] References Cited

U.S. PATENT DOCUMENTS

| | | | |
|---|---|---|---|
| 2,225,949 | 12/1940 | Bennett | 208/351 |
| 2,725,342 | 11/1955 | Lambert | 196/73 |
| 2,773,559 | 12/1956 | Cottle | 208/351 |
| 2,970,107 | 1/1961 | Gilmore | 208/365 |
| 3,121,056 | 2/1964 | Hull | 208/365 |
| 3,320,158 | 5/1967 | Potts | 208/355 |
| 4,551,238 | 11/1985 | Marks | 208/340 |
| 4,964,980 | 10/1990 | McCarthy | 208/358 |

FOREIGN PATENT DOCUMENTS 2311571 12/1976 France .

OTHER PUBLICATIONS

Perry's Chemical Engineers' Handbook, 6th Edition, 1984, pp. 11-21 through 11-24.

Primary Examiner—Helen M. S. Sneed
Assistant Examiner—Walter D. Griffin
Attorney, Agent, or Firm—Millen, White, Zelano, & Branigan

[57] ABSTRACT

A description is given of a process for the fractionation of oil and gas on a petroleum deposit effluent, including:
(a) a stage wherein the liquid and gaseous phases are separated at the gas evacuation pressure P1, producing a gaseous fraction G1, on the one hand, which is evacuated, and a liquid fraction L1, on the other hand, which is constituted at least partially of oil, sending the liquid fraction L1 to stage (b);
(b) at least one distillation stage carried out at a pressure P2 which is less than or at least equal to the pressure P1 in stage (a), in a distillation zone C1 which has an internal heat exchange zone and a reboiling zone, and which permits a gaseous fraction G2 to be recovered, on the one hand, and a liquid fraction L2 to be recovered, on the other hand, which is sent to the internal exchange zone, then evacuated; and
(c) at least one recompression stage at the pressure P1 of at least a part of the gaseous fraction G2 which is at least partly mixed with the gaseous fraction G2 and evacuated.

20 Claims, 2 Drawing Sheets

PROCESS FOR THE FRACTIONATION OF OIL AND GAS ON A PETROLEUM DEPOSIT EFFLUENT

BACKGROUND OF THE INVENTION

The invention relates to a process for the fractionation of oil and gas on a petroleum deposit effluent.

The treatment of a petroleum deposit effluent usually involves a stage for oil-gas fractionation which aims to adjust the bubble point of the oil produced in such a way that it is rendered thermodynamically stable under storage conditions.

The treatment can also involve a de-acidification stage for the oil produced which consists mainly in extracting most of the hydrogen sulphide($H_2S$) for toxicity and corrosion related reasons.

These stages are usually simultaneous, with the effluent produced undergoing a series of successive expansions, usually 3 or 4, from the pressure at which the effluent issues from the well to a pressure which is close to atmospheric pressure, the gas produced being removed or recompressed with each expansion, the effluent usually being heated prior to the last expansion in order to satisfy vapor pressure and $H_2S$ content requirements.

The specified requirements for the oil produced are as follows:

For the vapor pressure, the criterion usually taken is the vapor pressure at 100° F. expressed as PSI or Reid Vapor Pressure (RVP). This specified requirement is usually between 8 and 12 PSI.

For the $H_2S$ content, the usual specified requirement is 60 ppm. mass.

The gas produced on each expansion contains heavy constituents ($C_4+$) which do not have to be withdrawn from the oil in order to stabilize it. It is desirable to recover these heavy constituents so that they can be reinjected into the oil, since this increases the amount of stabilized oil produced, while reducing its density, which increases its marketing value. Moreover, the presence of these heavy constituents in the gas produced confers upon the gas a high hydrocarbon dew point which can have adverse effects upon marketing the gas.

Recompression of the gas produced on each expansion and also partial condensation thereof by cooling makes it possible for a part of the heavy constituents to be recovered, but also makes for an increase in extra investment costs with the compression output needed.

SUMMARY OF THE INVENTION

It has been discovered that oil-gas fractionation, by itself or in association with de-acidification of the oil produced, can be carried out with a high oil yield and with substantial savings with respect to the heating output, compression output and with respect to the bulk of the installation, which can be of major significance in the case of oil production at sea, for example.

It has also been discovered that these treatment operations can be carried out in at least one expansion stage less than is usually required with successive expansion fractionation operations.

Generally speaking, the process for oil-gas fractionation on a petroleum deposit effluent according to the invention is characterized in that it consists of the following main stages:

(a) a stage wherein the liquid and gaseous pahses are separated at the gas evacuation pressure P1, producing a gaseous fraction G1, on the one hand, which is evacuated, and producing a liquid fraction L1, on the other hand, which is composed at least in part of oil, said liquid fraction L1 being sent to stage (b);

(b) at least one distillation stage which is carried out at a pressure P2 which is less than or at least equal to the pressure P1 in stage (a), in a distillation zone C1 which consists of an internal heat exchange zone and a reboiling zone, and which permits a gaseous fraction G2 to be recovered, on the one hand, and a liquid fraction L2 to be recovered, on the other hand, which is sent into said internal exchange zone, then evacuated; and (c) at least one recompression stage at pressure P1 of at least a part of the gaseous fraction G2 which is at least partially mixed with the gaseous fraction G1 and evacuated.

It has actually been discovered, and this is one of the main objects of the present invention, that by using an internal heat exchange zone it is possible to make substantial savings on the heat which is to be brought to the reboiling installation in the distillation zone C1.

It has also been discovered that in cases where the treated effluent contains an acid gas, in particular $H_2S$, it is possible to satisfy the two criteria for thermodynamic stability and $H_2S$ content, by adjusting the temperature of the reboiling installation and the number of stages in the distillation step. In particular, by virtue of the separating capability of the distillation operation, the present invention permits elimination of $H_2S$ until the criteria for effluents containing up to several % by mass of $H_2S$ is satisfied, and this without high hydrocarbons ($C_4+$) being lost at the head of the distillation zone.

It has also been discovered that the internal heat exchange zone permits the distillation residue to be cooled, thereby increasing thermodynamic stability and making savings on subsequent cooling treatments.

DETAILED DESCRIPTION OF THE INVENTION

Figure 1:
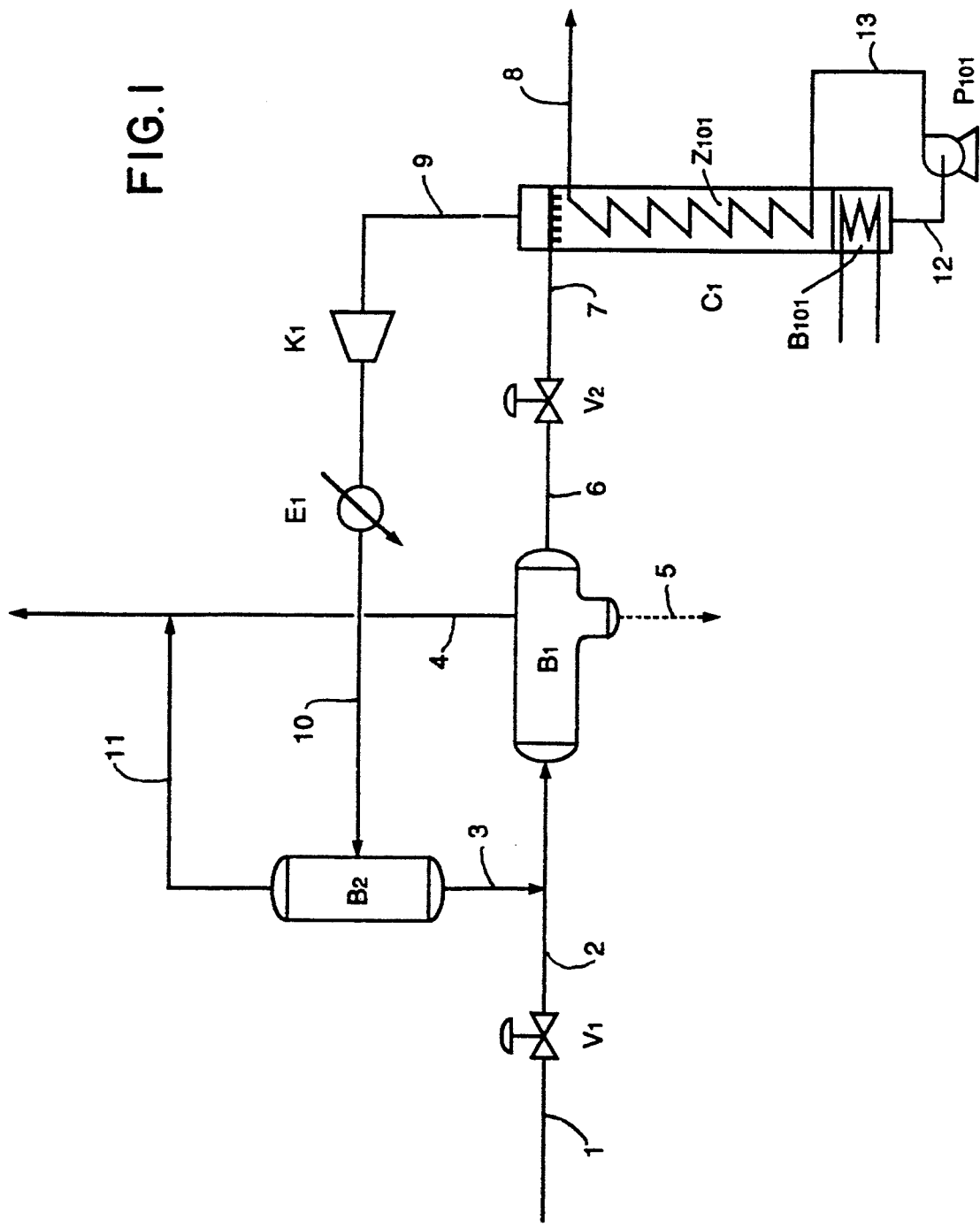
FIG. 1 is a schematic view of the inventive process.

The process according to the invention will be described in greater detail hereinafter with reference to FIG. 1. The description is more particularly concerned with the treatment of a petroleum deposit effluent which contains associated light hydrocarbons.

The effluent to be treated arrives through the conduit 1. It is expanded at the gas evacuation pressure P1 (between 1 and 10 MPa, for example) in the valve V1 whence it issues in partly vaporized form through the conduit 2 and is mixed with a liquid fraction coming from the ballon flask B2 and arriving via the conduit 3.

The mixed phases thus obtained are separated in the ballon flask B1. The gaseous phase is evacuated through the conduit 4, mixed with a gaseous phase coming from the ballon flask B2 arriving via the conduit 11, and evacuated from the process. In common cases, where the effluent issuing from the well contains water, this latter is separated in the ballon flask B1, and this aqueous phase is evacuated from the process through the conduit 5.

The liquid hydrocarbon phase is evacuated via the conduit 6, then expanded in a valve V2 to a pressure P2 which is between the pressure P1 and atmospheric pressure. The pressure P2 is between 0.15 and 1 MPa, for example.

The hydrocarbon phase issuing from the valve V2 through the conduit 7 is introduced (stage (b)) into a distillation zone C1. This distillation zone has a reboiling zone B101 and an internal heat exchange zone Z101 wherein the liquid L2 coming from said reboiling zone B101, and rising along said internal heat exchange zone Z101, reheats the liquid L1 and the vapor circulating at counter-current in the distillation zone C1.

The temperature in the reboiling zone B101 is usually between 100° C. and 250° C., and preferably between 140° C. and 200° C.

The distillation residues satisfies RVP and $H_2S$ requirements. After having risen back through the internal head exchange zone Z101, it is evacuated through the conduit 8.

The vapor distillate is evacuated through the conduit 9; in stage (c), it is at least partially recompressed in the compressor K1 from the pressure P2 to the pressure P1, and is then usually cooled in the heat exchanger E1 by an external fluid which may be water, for example, or air, or any other cooling fluid available on the site. This recompression-recooling sequence makes it possible for a liquid phase to be condensed which is rich in high hydrocarbons.

The liquid-vapor mixture which is thus formed is evacuated from the heat exchanger E1 to the ballon flask B2 through the conduit 10. The liquid phase is evacuated from the balloon flask B2 through the conduit 3 and is mixed with the effluent which comes from the valve V1 and which arrives via the conduit 2 in order to be sent to the ballon flask B1 (stage (a), as already described hereinabove).

The vapour phase is evacuated from the balloon flask B2 through the conduit 11 and is mixed with a gaseous fraction coming from the balloon flaks B1 and arriving via the conduit 4, as already described hereinabove.

Recompression of the gaseous phase issuing at the head of the column C1 can be carried out in one or more compression stages; it is, however, advantageous if the recompression is carried out in one single stage in order to limit the number of compressors; to this end, it is possible to select a pressure P2 which is intermediate between pressure P1 and atmospheric pressure P0 and in a ratio such as P2/P0, for example, which is at least equal to half of P1/P2.

The gaseous phase G2 which is recompressed at pressure P1 could, of course, be mixed with the gaseous phase G1 and evacuated from the process directly without cooling, but it is much more advantageous to cool the gaseous phase G2 after recompression in order to condense a part of the phase G2, and, after separation in the balloon flask B2, to recycle the liquid phase thus obtained to a balloon flask B1 as already described hereinabove.

Figure 2:
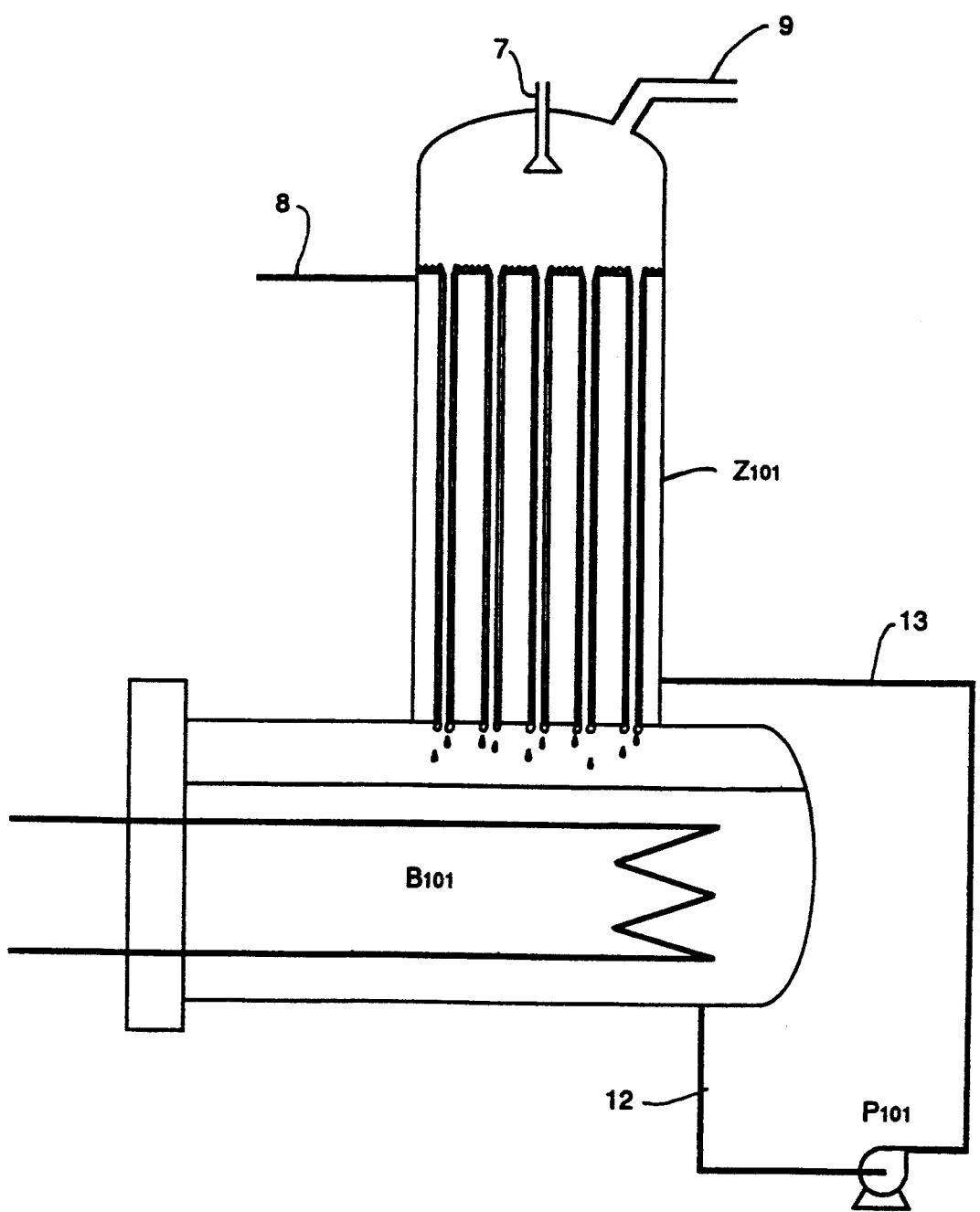
FIG. 2 is a view of a distillation column and reboiler having internal heat exchange which is useful in the inventive process.

To carry out step (b) of the process of the invention, it is possible to use a device such as that which will be described hereinafter in conjunction with FIG. 2.

The device mainly consists of:

A reboiling zone B101 consisting of a balloon flask with a capacity which enables a reboiling device known to those skilled in the art, such as an electric heating means, for example, or a heat conducting fluid circulation pin, or a heated tube, to be immersed in the distillation residue;

An internal heat exchange zone Z101, disposed above the reboiling zone, formed by two circulation spaces; in one of these spaces, the oil to be degassed flows by the effect of gravity, arriving at the bead of the distillation device C1 via the conduit 7, counter-current to the vapor rising in the reboiling zone B101 through said internal heat exchange zone Z101, said vapor then being evacuated from the distillation device C1 through the conduit 9; in the other space, the residue issuing from the reboiling zone B101 through the conduit 12, flows from the bottom to the top, through the pump P101 and re-enters the heat exchange zone via the conduit 13, then issuing from said heat exchange zone Z101 via the conduit 8.

The internal heat exchange zone Z101 can be designed in various ways, some examples being given hereinafter.

By way of example, the internal heat exchange zone Z101 can be formed by vertical tubes in which the oil to be degassed flows like a film and falls onto the inner walls of the tubes. While the residue rising in the reboiling zone B101 circulates outside the tubes in the calender. The inner wall of said vertical tubes can be smooth, but can also have regions of unevenness, or it can undergo a surface treatment to promote transfer of the substance or heat between the phases circulating inside the tubes, and also to promote heat transfer between the phases circulating on either side of the tube walls. By way of example, the geometry of the inner surface of the tubes can be such that the appearance of waves is promoted within the falling liquid film, or it can have grooves along the tube axis in order to increase the inside surface area of the tubes, or it can be coated with a deposit of solid agglomerate particles to promote nucleation of the balls of vapor within the falling liquid film.

Said vertical tubes can also be filled with a loose filling such as balls, rings or saddle-shaped members, for example. Preferably, the maximum size of a packing element does not exceed one eighth of the diameter of said tubes.

Said vertical tubes can also be filled with a structured packing formed, for example, from wire gauze, wire wool, plates or braces such as used in static mixers, for example.

Another possibility is to make the contact between the oil to be degassed and the vapour rising from the reboiling zone B101 through the calandria on the outer surface of the tubes, the residue rising through the pump P101 from the reboiling zone B101 inside the tubes. In this case, the calender can be empty of filled with a loose or structured packing. Also, in this case, the external surface of the tubes can be smooth or have regions of unevenness, or it can undergo a surface treatment to promote transfer of the substance or heat between the phases circulating outside the tubes, and also to promote heat transfer between the phases circulating on either side of the tube walls.

The internal heat exchange zone Z101 can also be of any structure known to those skilled in the art. For example, it may have two circulation spaces, one in the form of spooled tubes, and the other in the form of a calender surrounding said tubes; said circulation spaces can also be delimited by an assembly of plates.

The distillation device C1 can also consist of a device for distributing the oil to be degassed in the corresponding circulation space from the internal heat exchange zone Z101 in cases where this space is in a multiplicity of parts (in the form of tubes, for example). Such devices are known to those skilled in the art.

The following example illustrates the invention.

EXAMPLE

In this example, the procedure outlined in FIG. 1 is followed. The effluent to be treated which is a crude petroleum issuing from the production well arrives via the conduit 1 at a flow rate of 138.2 tons/h; its temperature is 60° C. its pressure is 30 MPa. It is expanded to the pressure P1 of 3 MPa in the valve V1 whence it issues through the conduit 2 at a temperature of 37° C. It is then mixed with a liquid phase L3 issuing from the balloon flask B2 through the conduit 3 at a flow rate of 1.55 tons/h; this liquid phase is at a temperature of 35° C. and at a pressure of 3 MPa. The mixture thus obtained is sent to the balloon flask B1 where the liquid and gaseous phases are separated. The gaseous phase G1 is evacuated through the conduit 4 at a flow rate of 40.6 tons/h; two liquid phases are also separated: the hydrocarbon liquid phase L1 is evacuated through the conduit 6 to the valve V2 at a flow rate of 85.9 tons/h; the aqueous liquid phase is evacuated from the process through the conduit 5 at a flow rate of 13.2 tons/h. In the valve V2, the liquid phase L1 is expanded up to a pressure P2 of 0.67 MPa and is partially vaporized, the liquid and vapor phases thus obtained being at a temperature of 32° C. and entering the distillation zone C1 via the conduit 7, the distillation zone C1 containing an internal heat exchange zone Z101 and a reboiling zone B101. The temperature in the reboiling installation B101 is 147° C. The internal heat exchange zone Z101 is formed by vertical tubes wherein the oil to be degassed falls in a film on the inner walls of the tubes. The liquid phase L2 issuing from the reboiling zone B101 through the pump P101 at 147° C. is returned to the internal heat exchange zone Z101 wherein it circulates outside the tubes, then is evacuated at the head of the distillation zone C1 via the conduit 8 at 71° at a flow rate of 79.4 tonnes/h. The vapor phase G2 is evacuated from the head of the distillation zone C1 via the conduit 9 at a flow rate of 6.5 tons/h at a temperature of 40° C.

Issuing from the distillation zone C1 via the conduit 9, the gaseous phase G2 enters the compressor K1, the output of which is 282 kW, whence it re-issues at a pressure of 3 MPa and at a temperature of 131° C., and enters the heat exchanger E1. In the heat exchanger E1, the gaseous phase G2 is recooled to 35° C. by cooling water external to the process, this cooling operation causing condensation of a fraction of the gas in the form of a liquid phase L3. The mixture is evacuated from the heat exchanger E1 via the conduit 10 and is sent into the balloon flask B2 wherein the liquid and gaseous phases are separated. The liquid phase L3 is mixed with the fluid coming from the valve V1 via the conduit 2, the gaseous phase is evacuated via the conduit 11 and mixed with the gaseous phase G1 circulating in the conduit 4, and the gaseous phase resulting from this mixture is evacuated at the temperature of 36° C. at a flow rate of 45.6 tons/h.

We claim:

1. A process for the fractionation of oil and gas from a petroleum deposit effluent said process comprising:
   in a stage (a), introducing the petroleum deposit effluent containing oil and gas into a separator and separating liquid and gaseous phases at a gas evacuation pressure, P1, producing a gaseous fraction, G1, and producing a liquid fraction, L1, composed at least in part of oil, and sending said liquid fraction, L1, to at least one distillation stage (b) which comprises a distillation zone (C1) having an internal heat exchange zone and a reboiling zone wherein the internal heat exchange zone is formed by vertical tubes and a calandria which surrounds said tubes;
   in said at least one distillation stage (b), distilling the liquid fraction, which passes through said internal heat exchange zone as a falling film, at a pressure, P2, which is less than the pressure, P1, in stage (a) and more than atmospheric pressure, in said distillation zone (C1), and recovering a gaseous fraction, G2, and a liquid fraction, L2; reboiling said liquid fraction, L2, and passing the resultant vapor into and through said internal heat exchange zone; and
   in at least one recompression stage (c), recompressing at pressure, P1, at least a part of the gaseous fraction, G2, and at least partially mixing the recompressed gaseous fraction, G2, with the gaseous fraction, G1, and recovering the resultant mixture.

2. A process according to claim 1, wherein stage (b) is carried out at an intermediate pressure, P2, between the pressure, P1, at which stage (a) is carried out and atmospheric pressure, P0, the ratio P2/P0 being at least equal to half the ratio P1/P2.

3. A process according to claim 1, wherein in stage (c), after recompression, the gaseous fraction, G2, is cooled and at least partly condensed, the liquid phase thus obtained being recycled to stage (a).

4. A process according to claim 1, wherein the base distillation temperature in stage (b) is between 100° C. and 250° C., and the pressure in the distillation zone is between 0.15 and 1 MPa.

5. A process according to claim 1, wherein the liquid fraction, L2, circulates and rises in the internal heat exchange zone, substantially counter-current to the liquid phase, L1, which descends in the distillation zone.

6. A process according to claim 1, wherein in distillation stage (b) the contact between the liquid fraction, L1, to be degassed and the gaseous fraction, G2, rising from the reboiling zone is effected inside the tubes, while liquid fraction, L2, as the distillation residue, rises outside the tubes through the calender.

7. A process according to claim 6, wherein the liquid fraction, L1, which is to be degassed falls through the tubes as a falling film.

8. A process according to claim 6, wherein the inner surface of the tubes has regions of unevenness, or has undergone a surface treatment to promote heat transfer and/or contact between the gas and liquid phases.

9. A process according to claim 6, wherein the vertical tubes are packed with loose parking elements.

10. A process according to claim 9, wherein the maximum size of the packing elements is less than one eighth the diameter of the vertical tubes.

11. A process according to claim 6, wherein the vertical tubes are packed with structural packing elements.

12. A process according to claim 1, wherein in distillation step (b) the contact between the liquid fraction, L1, to be degassed and the gaseous fraction, (G2), rising in the reboiling zone is effected in the calandria, while the liquid fraction, L2, as the distillation residue, rises inside the tubes.

13. A process according to claim 12, wherein the external surface of the tubes has regions of unevenness, or has undergone a surface treatment to promote heat transfer and/or contact between the gas and liquid phases.

14. A process according to claim 12, wherein the calandria is packed with loose packing elements.

15. A process according to claim 13, wherein the calandria is packed with structured packing elements.

16. A process according to claim 1, wherein distillation is carried out in a vertical zone, without a condenser, and supplied at the head.

17. A process according to claim 2, wherein in stage (c), after recompression, the gaseous fraction, G2, is cooled and at least partly condensed, the liquid phase thus obtained being recycled to stage (a).

18. The process of claim 12 wherein the liquid fraction, L1, to be degassed in the distillation zone flows down as a falling film outside the tubes.

19. The process of claim 1, wherein the petroleum deposit effluent is crude petroleum.

20. The process of claim 1, wherein the petroleum deposit effluent contains $H_2S$.

* * * * *

UNITED STATES PATENT AND TRADEMARK OFFICE
CERTIFICATE OF CORRECTION

PATENT NO. : 5,389,242
DATED : February 14, 1995
INVENTOR(S) : Christophe LERMITE et al.

It is certified that error appears in the above-indentified patent and that said Letters Patent is hereby corrected as shown below:

Claim 9; column 6, line 55: Change "parking" to -- packing --.

Signed and Sealed this

Fourth Day of July, 1995

Attest:

BRUCE LEHMAN

Attesting Officer

Commissioner of Patents and Trademarks